UNITED STATES PATENT OFFICE.

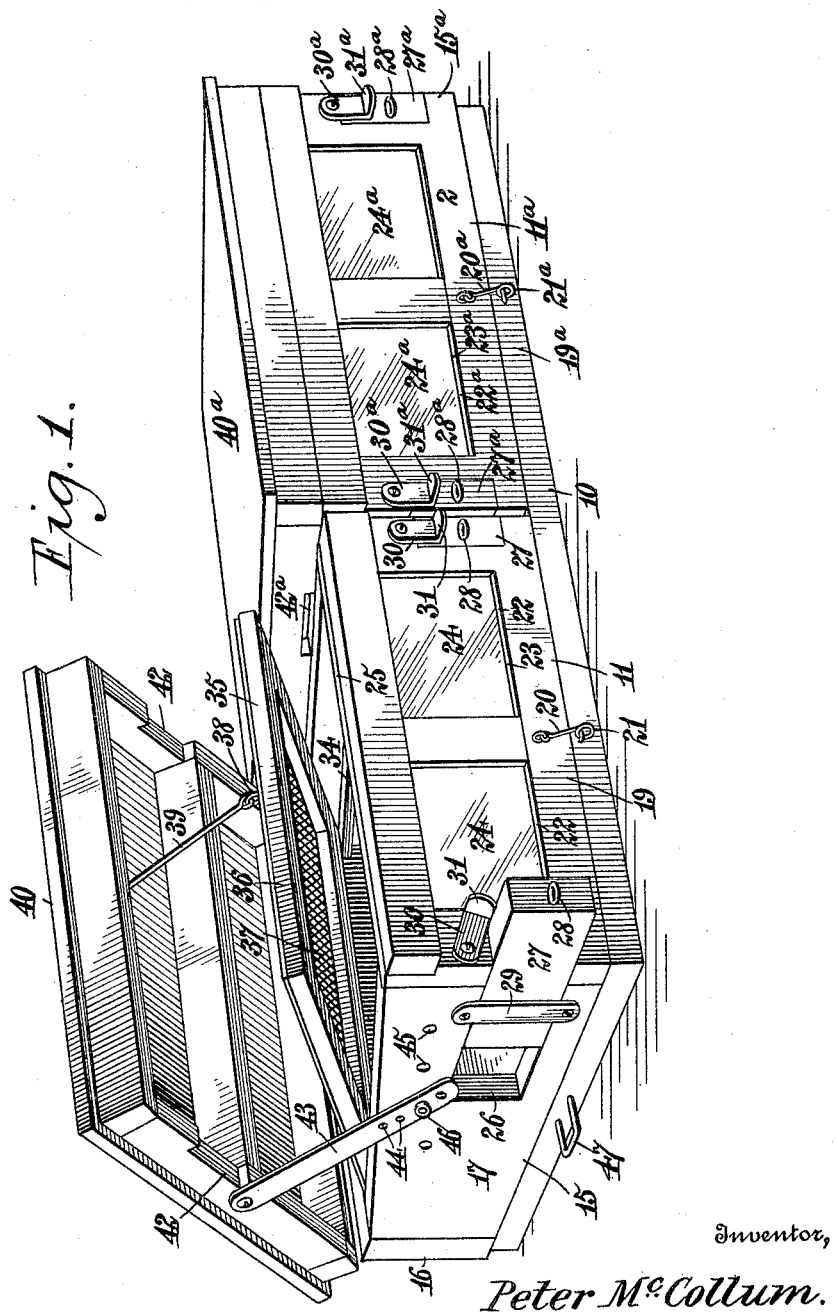

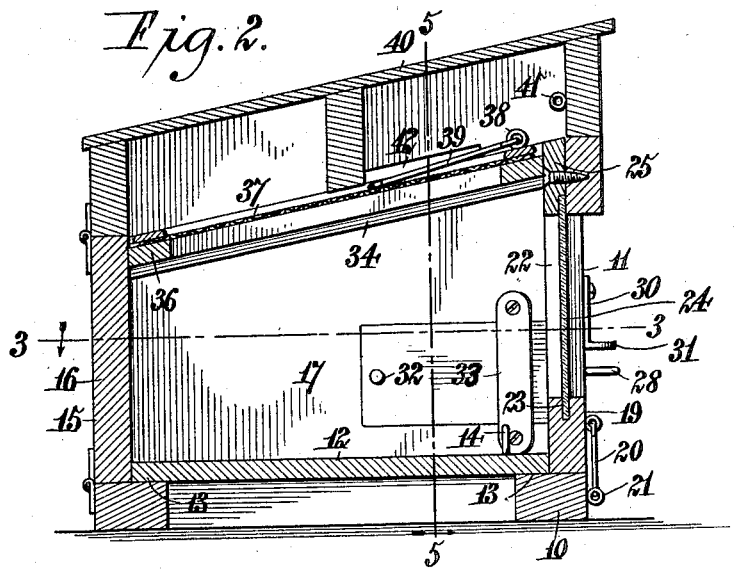
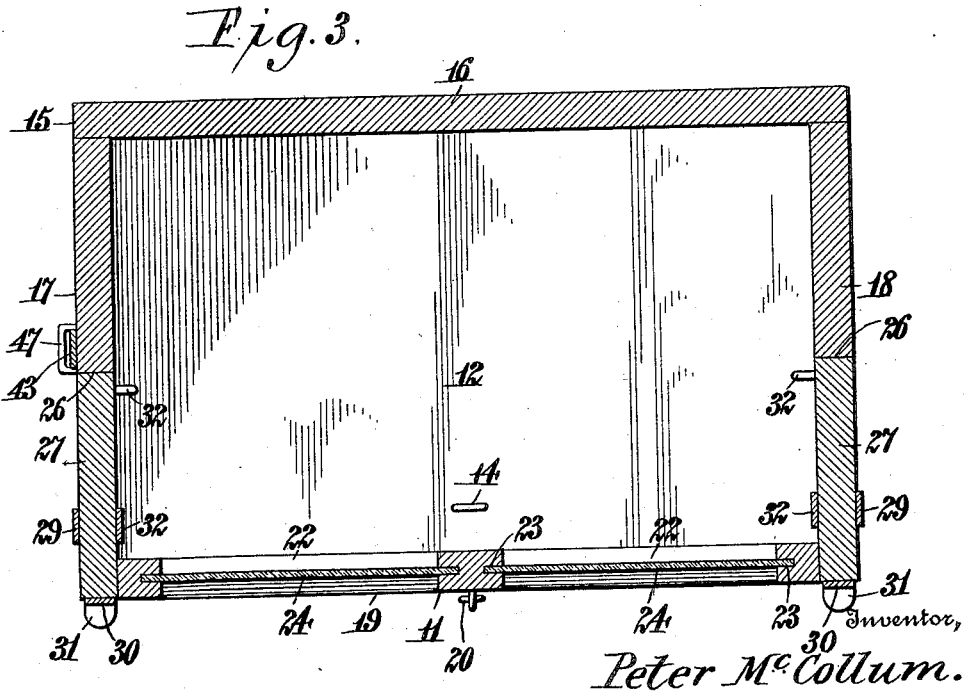

PETER McCOLLUM, OF FAYETTE, MISSOURI.

BROODER.

1,115,326.  Specification of Letters Patent.  Patented Oct. 27, 1914.

Application filed September 19, 1911. Serial No. 650,077.

*To all whom it may concern:*

Be it known that I, PETER McCOLLUM, a citizen of the United States, residing at Fayette, in the county of Howard and State of Missouri, have invented new and useful Improvements in Brooders, of which the following is a specification.

An object of the invention is to provide a brooder for the conservation of poultry.
My invention embodies among other features, a structure providing efficient ventilation and light, coincident with weather conditions, thus securing for the poultry in the brooder, conditions, which will aid in greatly facilitating the proper development of the poultry.

In a large number of brooders, now generally used, a box-like structure is employed, the floor, walls and roof of which are rigidly secured so that difficulty is experienced in keeping the brooder clean and supplying sufficient light and ventilation to the contents thereof.

In my device I aim to produce a brooder, parts of which are removable and adjustable so that the brooder can be easily cleaned, while at the same time the entire structure is arranged so that various degrees of light and ventilation can be easily and readily obtained.

Reference is to be had to the accompanying drawings constituting a part of this specification, in which similar characters of reference denote corresponding parts in all the views, and in which—

Figure 4:
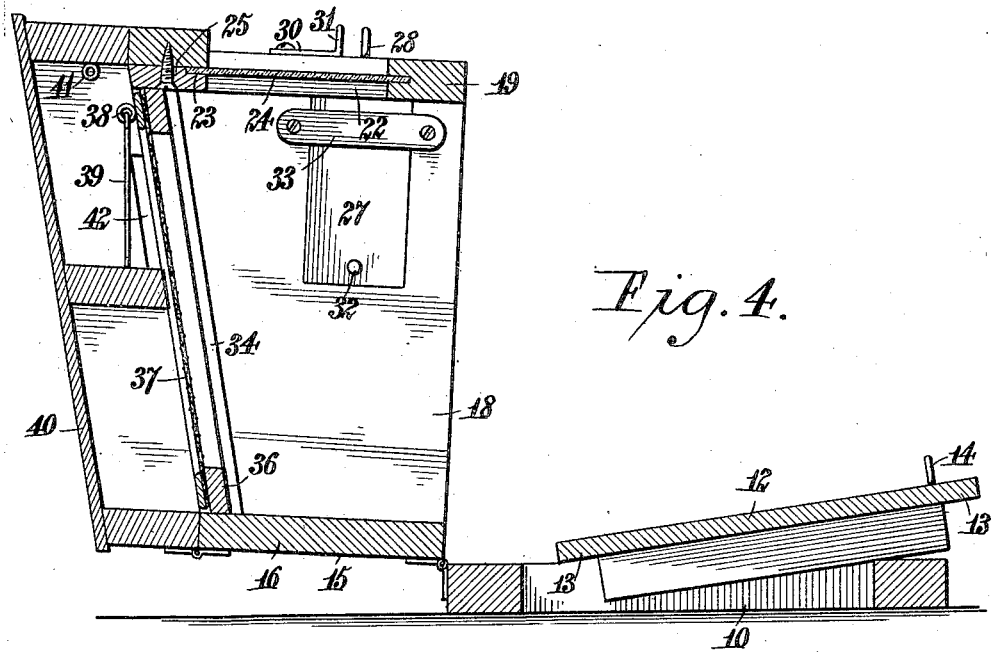
Figure 5:
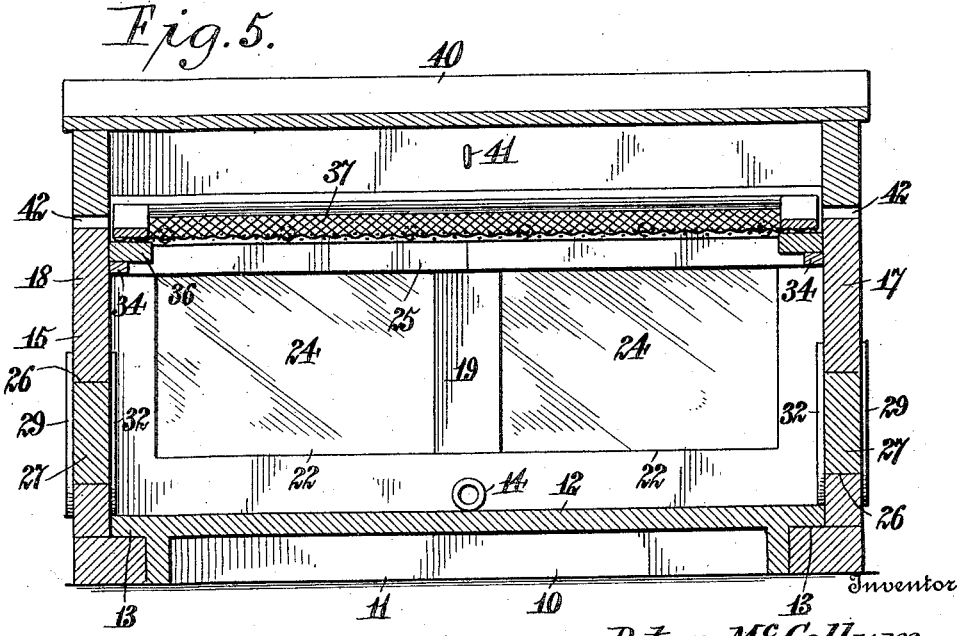

Figure 1 is a perspective view of a pair of brooders mounted on a single base, one of the brooders being shown in closed position with parts of the other brooder in open position. Fig. 2 is a vertical sectional view taken through one of the brooders and showing the interior arrangement thereof. Fig. 3 is a horizontal sectional view taken substantially on the line 3—3 in Fig. 2, looking in the direction of the arrow. Fig. 4 is a vertical sectional view of one of the brooders, various parts thereof being shown in raised position with the floor of the brooder partially removed therefrom. Fig. 5 is a vertical sectional view taken on the line 5—5 in Fig. 2, looking in the direction of the arrow.

Referring to the views, and more particularly to Fig. 1, I provide a base 10 having adjacent brooders 11, 11ª mounted thereon. The brooder 11ª is similar in construction and design to the brooder 11 and for the purpose of simplifying the description I will designate the various parts of the brooder 11ª with the same numerals employed for designating the brooder 11, with the exception that the numerals designating the parts of the brooder 11ª will have the letter "a" affixed thereto, so that when a numeral is employed to designate a part of the brooder 11, the same numeral will be employed on the drawings to designate a similar part of the brooder 11ª, the mentioned number employed for designating a similar part on the brooder 11ª being provided with the letter "a" to show that this part is a portion of the brooder 11ª as mentioned heretofore. The base 10 consists of a rectangular structure arranged to form an opening in which a floor 12 is removably positioned, the said floor being provided with projecting portions 13, which engaging the base 10 retain the floor 12 in proper position on the base, a suitable handle 14 being secured to the floor to permit of easily raising the same for the purpose of removing the floor from engagement with the base, the upper surface of the said floor being normally above the upper surface of the base 10 as will be readily understood.

Hingedly mounted on the rear side of the base 10 is a frame 15 consisting of a rear wall 16, end walls 17, 18 and a front wall 19, the front wall 19 being higher than the rear wall 16 thus making the upper edges of the end walls 17, 18 inclined as will be seen by referring to Fig. 1. A hook 20 is mounted on the front wall 19 and is adapted to engage an eyelet 21 secured to the base 10 for the purpose of releasably retaining the front portion of the frame 15 in engagement with the base 10, the floor 12 being arranged within the walls 16, 17, 18 and 19. The front wall 19 is provided with openings 22, the walls of the said openings being provided with grooves 23 so that window panes 24 can be slidably arranged in the grooves 23 to close the openings 22, removable securing sections 25 being connected to the inner side of the front wall 19 in any convenient manner to rigidly retain the window panes 24 in stationary position in the openings 22 of the front wall 19.

The end walls 17, 18, are provided with openings 26 and mounted to slide on the end walls 17, 18 are slide doors 27 provided with handles 28, the said slide doors being adapted to close the openings 26, guides 29 being secured to the end walls and extending across sides of the slide doors 27 to properly guide the slide doors in their operation. Pivotally mounted on the front wall 19 are locking dogs 30 provided with lateral flanges 31, constituting suitable handles, the said locking dogs having their lower ends adapted to partially extend across the outer ends of the slide doors 27 when the same are in closed position to retain the slide doors in locked relation relatively to the end walls 17, 18, the locking dogs 30 being simply swung to one side when it is desired to move the slide doors 27 into open position as shown in Fig. 1, suitable stop lugs 32 being provided on the inner sides of the slide doors 27 and adapted to engage guides 33 secured to the inner sides of the end walls 17, 18 for the purpose of limiting the outward movement of the slide doors 27.

Brackets 34 are secured to the inner sides of the end walls 17, 18 a distance below the upper ends of the end walls and mounted to repose on the brackets 34 is a screen roof 35, consisting of a frame 36 and a screen 37 conveniently secured to the frame 36, the screen roof 35 being removable from the brackets 34 and provided with an eyelet 38 having a hook 39 attached thereto for a purpose that will be hereinafter more fully disclosed, the upper edge of the screen roof 35 being adapted to lie flush with the upper edges of the walls 16, 17, 18 and 19 when the screen roof is in position on the brackets 34.

Mounted to swing on the rear wall 16, adjacent the upper edge thereof is a main roof 40 provided with an eyelet 41 adapted to receive an end of the hook 39 for the purpose of connecting the screen roof 35 to the main roof 40 and ventilating apertures 42 are provided in the main roof 40 for the purpose of producing a circulation within the brooder 11 when the main roof is in lowered position and the openings 26 are closed by the slide doors 27. Mounted to swing on the main roof 40 is an adjusting bar 43, provided with transverse apertures 44, the end wall 17 being provided with transverse apertures 45, one of which is adapted to register with the apertures 44 so that a pin 46 can be passed through the registering apertures to retain the main roof 40 in raised position relatively to the body of the brooder 11. Thus it will be seen that the main roof 40 can be conveniently adjusted to any height and if desirable the screen roof 35 can be connected to the main roof 40 by means of the hook 39, engaging the eyelet 41 to permit of adjusting the screen roof 35 with the main roof 40. A stirrup 47 is secured to the base 10 and adapted to act as a guide for the adjusting bar 43 when the roof 40 is in lowered position, as will be readily understood.

In the use of my device, the main roof 40 can be conveniently adjusted to raised position to permit a quantity of air to enter the brooder 11 and the main roof 40 can also be adjusted to act as a baffle for the rays of the sun and prevent the same from entering the interior of the brooder. By connecting the screen roof 35 to the main roof 40 by means of the hook 39, the screen roof will be capable of adjustment with the main roof 40 and by opening the slide doors 27, the poultry contained in the brooder can easily escape therefrom, the openings 26 being also adapted to provide suitable ventilation. Assuming that the slide doors 27 are in open position, when the same are closed, the locking dogs 30 will gravitationally move over the ends of the slide doors to lock the same and by opening the slide doors at the inner ends of the adjacent brooders 11, 11$^a$, any poultry in the brooder 11 can pass through the openings made by opening the mentioned slide doors and pass into the brooder 11$^a$.

When it is desired to clean the brooder 11, the hook 20 is disengaged from the eyelet 21 and the upper portion of the brooder can then be swung rearwardly and out of engagement with the floor 12, which can be conveniently removed from the base 10 by means of the handle 14 to permit of easily cleaning the floor 12 and the base 10, while at the same time the upper portion of the brooder being moved rearwardly to lie on the rear side thereof, can also be easily cleaned, as will be readily understood.

From the foregoing description it will be seen that an efficient brooder is employed, in which various parts thereof are adjustable and removable for the purposes of securing better ventilation, cleaning the brooder or transporting the same from one place to another and although I have shown a particular construction in the drawings and have described a particular form of my device, it will be understood that I do not limit myself thereto and that the scope of the invention is defined in the appended claims.

Having thus fully described the invention, what I claim as new, is:—

1. In a brooder, the combination with a base, of a frame carried by the base, strip-like brackets on the inner side of the walls of the frame and spaced from the upper edges thereof, a screen roof loosely supported on the brackets and adapted to normally lie flush with the upper edges of the frame, said screen roof being removable from the said brackets and not hinged thereto or to the said frame but being adapted to swing on its rear edge when the front edge of the screen roof is raised or lowered relatively to the said brackets, a main roof mounted to swing on the frame and form a cover therefor, means carried by the main roof and adapted for adjustable connection with the frame for supporting the main roof in various open positions relatively to the frame, and means for connecting the main roof and screen roof to support the screen roof in raised position relative to the adjusted position of the main roof.

2. In a brooder, the combination with a base, of a frame carried thereby, a screen roof loosely supported on the frame, but not having hinged connection therewith, a main roof mounted to swing on the frame, an adjusting bar mounted to swing on the main roof on an exterior face thereof and provided with a series of apertures, a pin adapted to pass transversely through one of the apertures of the adjusting bar and extend into the frame to adjustably support the main roof in various open positions relatively to the frame, and a member swingingly connecting the main roof with the screen roof for securing the main roof in an open position relative to the adjusted position of the main roof.

In testimony whereof I affix my signature in presence of two witnesses.

PETER McCOLLUM.

Witnesses:
ROBERT W. CARROLL,
JOHN ROBERT MEGRAW.

Copies of this patent may be obtained for five cents each, by addressing the "Commissioner of Patents, Washington, D. C."